United States Patent Office 3,291,853
Patented Dec. 13, 1966

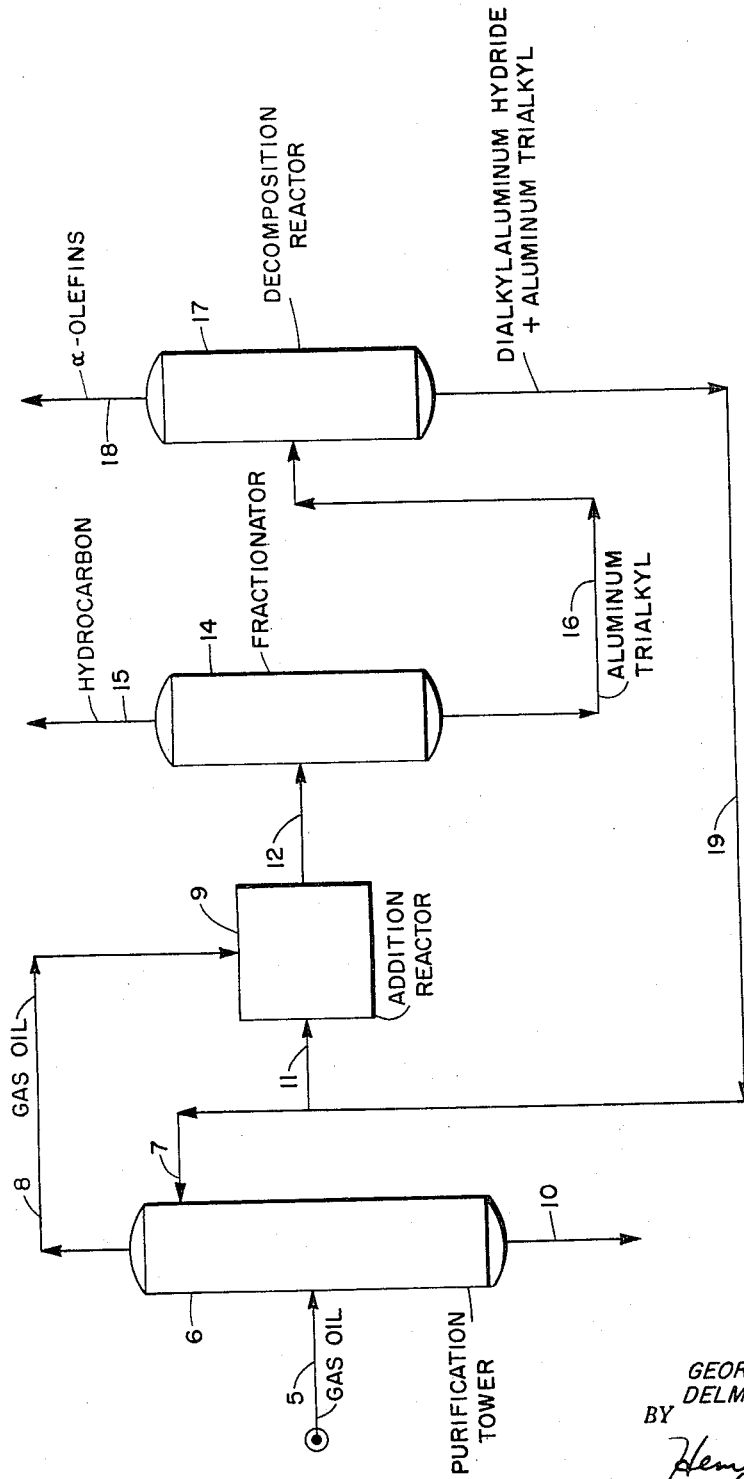

3,291,853
SEPARATION OF ALPHA-OLEFINS CONTAINING AT LEAST 5 CARBON ATOMS FROM MIXTURES CONTAINING THE SAME USING ALUMINUM DIALKYL HYDRIDE
George C. Feighner and Delmar D. Krehbiel, Ponca City, Okla., assignors to Continental Oil Company, Ponca City, Okla., a corporation of Oklahoma
Filed Aug. 13, 1963, Ser. No. 301,816
9 Claims. (Cl. 260—677)

This invention relates to a novel method for the separation of alpha-olefins from mixtures containing the same, and more particularly, it pertains to a method of separating alpha-olefins from a mixture containing non-olefinic hydrocarbons.

At present, no satisfactory commercial method is available for the recovery of alpha-olefins from cracked hydrocarbon stocks. There is an abundance of alpha-olefins in such materials, which can not be utilized for that reason. The lack of a satisfactory system for the recovery of alpha-olefins is unfortunate, because they can be used in many ways for industrial purposes. The straight-chained or moderately branched-chained alpha-olefins can be used for the preparation of detergents, such as the alkylbenzene sulfonates. The alpha-olefins containing about 9 to 18 carbon atoms are especially useful for such a purpose. The lower molecular weight alpha-olefins such as those containing 2 to 10 carbon atoms can be used in the preparation of useful polymers. The alpha-olefins are generally useful as intermediates for the preparation of many other chemical products. The potential usefulness of the alpha-olefins points to the need for an inexpensive and efficient operation for their recovery from mixtures containing aromatics, paraffins, naphthenes and other types of olefins.

Accordingly, an object of this invention is to provide a method of separating alpha-olefins from mixtures containing other hydrocarbons.

Another object of this invention is to provide a combination process for the recovery of alpha-olefins from mixtures containing other hydrocarbons which is suitable for commercial exploitation.

Other objects and advantages of this invention will become apparent from the following description and explanation thereof.

In accordance with the present invention, alpha-olefins can be separated from a mixture containing other hydrocarbons by combining the same with dialkylaluminum hydride in a reaction zone where the alpha-olefins react with the hydride to produce a reaction mass containing trialkylaluminum. The reaction mass is subjected to a separation treatment for the recovery of the trialkylaluminum. The recovered trialkylaluminum is then heated to a temperature at which it decomposes to produce dialkylaluminum hydride and alpha-olefin. The alpha-olefin is separated from the dialkylaluminum hydride and the latter is recycled to the reaction zone where it is reacted again with alpha-olefin admixed with other hydrocarbons. It is also contemplated utilizing a portion of the dialkylaluminum hydride for the removal of impurities containing sulfur, oxygen and/or nitrogen which are present in the feed mixture containing the alpha-olefins to be recovered.

In a particular aspect of the present invention, the feed material containing alpha-olefins is contacted with a mixture of dialkylaluminum hydride-trialkylaluminum compounds in an amount to react with all or substantially all of the alpha-olefins, and after separation of non-alpha-olefin hydrocarbons, trialkylaluminum is heated to liberate the alpha-olefins thus reacted.

The dialkylaluminum hydride which is employed in the present invention contains alkyl substituents having about 2 to 18 carbon atoms or more. The dialkylaluminum hydride preferably contains the type of alkyl substituent which can be converted into the alpha-olefin to be recovered from the mixture containing other hydrocarbons. If desired, the alkyl substituents of the hydride may be different from those which are to be acquired by reacting with the alpha-olefins to be recovered. Specific examples of the dialkylaluminum hydrides are diethylaluminum hydride, diisobutylaluminum hydride, dioctylaluminum hydride, didecylaluminum hydride, didodecylaluminum hydride, dihexadecylaluminum hydride, dioctadecylaluminum hydride, etc. The hydride chosen should allow easy separation of the trialkylaluminum compound from the unreacted hydrocarbons.

The mixture containing the alpha-olefins may be derived from any source as previously mentioned. The mixtures may be obtained from cracking operations in which various petroleum materials are treated to produce gasoline or other products. The cracked hydrocarbon streams may be derived from thermal or catalytic cracking operations. In general, the feed mixture can contain at least one other hydrocarbon in addition to the alpha-olefin. The other hydrocarbon can be an aromatic, paraffin, naphthene, etc. Usually the feed mixture contains alpha-olefin and a variety of hydrocarbons of two or more different types. The alpha-olefin may be present in the feed mixture either as a single type of compound or as a mixture of different types of alpha-olefins, namely, primary and secondary alpha-olefins as well as others. Depending on the type of feed mixture from which the alpha-olefin is to be recovered, the alpha-olefin may be a normally gaseous or a normally liquid material. Accordingly, the alpha-olefins may contain from about 2 to 18 carbon atoms or higher. The present invention is especially applicable for the recovery of alpha-olefins containing from about 5 to 18 carbon atoms, and still more particularly, alpha-olefins containing from about 9 to 18 carbon atoms. The alpha-olefin may be present in the feed mixture in widely varying amounts. The operability of the invention is not, in any way, limited by the quantity of alpha-olefin present in the feed mixture. Generally, the feed mixture contains about 5 to 90 percent alpha-olefin, more usually about 10 to 50 percent alpha-olefin, based on the weight of the feed mixture. In some cases, the feed mixture may be contaminated with sulfur, oxygen and/or nitrogen-containing compounds. Such contaminants may be present in the feed mixture in amounts of about 0.25 to 5 percent by weight of the feed mixture. The contaminants are usually present in the feed mixtures which are derived from petroleum cracking operations.

The present invention is also applicable for the separation of primary alpha-olefins from 1,1-dialkylethylene type olefins. The primary alpha-olefin will preferentially displace the 1,1-dialkylethylene type olefins when they are present as alkyl radicals of the aluminum compound. The feed mixture containing both primary and 1,1-dialkylethylene type olefins can be treated with dialkylaluminum hydride in an amount sufficient to react with all the primary alpha-olefin, thus leaving unreacted 1,1-dialkylethylene type olefin. In case 1,1-dialkylethylene type olefin is present as some or all of the alkyl substituents of the aluminum compound, the primary alpha-olefin can be reacted with the aluminum compound to displace substantially all of the 1,1-dialkylethylene type olefin. The preferential selectivity of the reaction between the primary alpha-olefin and the aluminum compound indicates that any dialkylaluminum hydride used as a starting material, which also contains 2-alkylalkyl substituents, will be readily converted to an aluminum compound containing all primary alkyl substituents if the feed mixture being treated contains primary alpha-olefins. The reaction between the two types of alpha-olefins can be illustrated by the following equation.

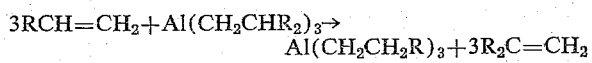

The equilibrium constant of the above reaction is about 40 which indicates the feasibility of preferentially reacting a stoichiometric amount of dialkylaluminum hydride to react with substantially all the primary alpha-olefin in a feed mixture containing also 1,1-dialkylethylene type olefin.

The dialkylaluminum hydride is reacted with an alpha-olefin at a temperature of about 80° to 130° C., preferably about 100° to 125° C. The alpha-olefin adds easily to the dialkylaluminum hydride, consequently the time of the reaction will depend upon the amount of alpha-olefin which is present in the the feed mixture. Generally, the time of reaction may vary from about 10 minutes to 3 hours, more usually about 30 minutes to 2 hours. The reaction may be conducted at any pressure, namely atmospheric, superatmospheric or subatmospheric pressure. Since the aluminum compound is susceptible to thermal degradation, it is preferred to employ a pressure which does not necessitate using a temperature significantly above 130° C. The quantity of dialkylaluminum hydride employed in the reaction depends upon the amount of alpha-olefin which is present in the feed mixture. For recovery of all the alpha-olefin from the feed mixture, at least a stoichiometric amount of dialkylaluminum hydride is employed. In those instances where the primary alpha-olefin is being separated from the 1,1-dialkylethylene type olefin in the same feed mixture, it is desirable to employ dialkylaluminum hydride in sufficient amount to react substantially only with the primary alpha-olefin. Otherwise, it is desirable to employ an excess of dialkylaluminum hydride above the stoichiometric amount to facilitate the reaction. As might be expected large quantities of dialkylaluminum hydride accelerate the reaction or shorten the reaction time. In the event that the feed mixture is gaseous, the reaction is effected by passing the feed mixture in contact with the liquid dialkylaluminum hydride. This can be accomplished by a countercurrent operation or simply by maintaining a liquid inventory in a reaction vessel and permitting the gaseous feed mixture to flow upwardly through it.

The reaction between the alpha-olefin and the dialkylaluminum hydride results in the addition product which is trialkylaluminum. In the next step of the operation, the trialkylaluminum is separated from the reaction product. Various methods can be used for the separation treatment, however, for commercial application it is preferred to strip the unreacted hydrocarbons from the trialkylaluminum. The aluminum compounds have a higher boiling point than the hydrocarbons, consequently, the stripping treatment can be effected at a temperature which is above the boiling point of the hydrocarbon components of the reaction product, but not significantly above 160° C. At temperatures about 160° C., there is a tendency for trialkylaluminums to decompose, hence such temperatures are preferably avoided in order to minimize the loss of alpha-olefin in the practice of the present invention. Accordingly, the other hydrocarbons present in the feed mixture boil at atmospheric or subatmospheric pressure, preferably at a temperature below 160° C., more usually at a temperature below about 140° C. and preferably at a temperature below about 130° C. When the feed mixture contains normally gaseous hydrocarbons, no separation treatment for the recovery of trialkylaluminum is employed. Where normally liquid hydrocarbons are present with the alpha-olefins in the feed mixture the normally liquid hydrocarbons may boil as low as 30° C. or at about 50° C. The stripping treatment can be facilitated by the use of a stripping gas. The stripping gas can be a normally gaseous hydrocarbon. It is also preferred to introduce the reaction product containing trialkylaluminum and hydrocarbons into the stripping zone under pressure. The release of pressure at the point of introduction of the reaction product causes more rapid vaporization of the hydrocarbons in the reaction product. The reaction product may be introduced into the stripping zone while it is under a pressure of about 100 to 300 p.s.i.g., more usually about 150 to 250 p.s.i.g. In some cases, it is desirable to maintain a vacuum of about 1 to 100 mm. Hg in the stripping zone.

To avoid undue loss of aluminum compound, especially the hydride, the operation of extracting alpha-olefins and pyrolyzing the trialkyl is conducted with a mixture of hydride and trialkyl. For the extraction of alpha-olefins, the mixture is about 40 to 90 percent hydride, more usually about 40 to 70 percent. In the pyrolyzing step, the feed containing hydride and trialkyl contains about 5 to 30 percent hydride, more usually about 10 to 25 percent hydride.

The trialkylaluminum which is recovered from the reaction product is subjected to a heat treatment for conversion to aplha-olefin and dialkylaluminum hydride. The pyrolysis treatment may be conducted at a temperature of about 160° to 220° C., more usually about 180° to 210° C. The conditions of pyrolysis are maintained to provide the removal of a maximum of only one alkyl substituent from the trialkylaluminum. To avoid the loss of dialkylaluminum hydride, it is preferred to conduct the pyrolysis treatment at a conversion level of about 40 to 80 percent. If the pyrolysis were conducted at a conversion of 100 percent, there might be a greater loss of usable aluminum compound than is desirable for a commercial operation. The residence time of the trialkylaluminum at the elevated temperature of pyrolysis is preferably controlled within narrow limits. The shorter the period during which the aluminum compound is held at an elevated temperature, the less chance for undesirable decomposition of the hydride to take place. For this purpose, a wiped film evaporator may be used in those cases where a very short residence time of the trialkylaluminum is desired. The trialkylaluminum may be also stabilized by the addition of a high boiling diluent, solvent or complexing agent. The solvent or diluent boils above the temperature at which pyrolysis is conducted, namely, above 220° C. It may boil below or above the aluminum compounds, however, it is preferred that the solvent or diluent boil below the boiling point of the aluminum compounds. A complexing agent may also exert a stabilizing effect on the aluminum compounds. In this connection, tridecylether and other aliphatic ethers boiling above that of highest boiling olefin present are useful as complexing agents. The time in which pyrolysis is conducted varies from about 5 seconds to 60 minutes, more usually about 10 seconds to 1 minute.

A series of experiments were conducted to illustrate the feasibility of the present process as a way for recovering alpha-olefins from hydrocarbon mixtures. These experiments are described below.

*Example 1*

An excess of octene-1 was added to dioctylaluminum hydride and the resultant mixture was heated to 125° C. for 20 minutes. Analysis of the reaction mixtures showed that all the hydride was converted to trioctylaluminum.

*Example 2*

An excess of dioctylaluminum hydride was added to a topped light coker gas oil of $C_{12}$–$C_{16}$ hydrocarbons which contained 15 percent terminal olefins, and the resultant mixture was heated to 125° C. for 2 hours. Infrared analysis revealed that no uncombined terminal olefins were present in the reaction mixture.

Example 3

Trioctylaluminum was heated in a flask for one hour at a temperature of 180° C. and a pressure of 1 mm. Hg. Octene-1 and dioctylaluminum hydride were recovered in amounts indicating a conversion of 77.1 percent.

Example 4

Diisobutylaluminum hydride was reacted with a 10 percent excess of hexadecene-1 to produce trihexadecylaluminum, isobutylene and excess hexadecene-1. The hexadecene-1 was separated from the reaction mixture by passage through a molecular still which had a skin temperature of 160° C. and 1 mm. Hg pressure. The remaining reaction mixture was passed twice through the molecular still at a temperature of 210° to 215° C. and a pressure of 1 mm. Hg to give a conversion of 51 percent to the dihexadecylaluminum hydride and hexadecene-1.

Example 5

Topped light coker gas oil enriched with an equal part by weight of equal amounts of $C_{12}$, $C_{14}$ and $C_{16}$ alpha-olefins was reacted with diisobutylaluminum hydride to produce a mixture of trialkylaluminum compounds in which the alkyl substituents were only $C_{12}$–$C_{16}$ in type. After separation of the trialkylaluminum, it was passed twice through the molecular still at a temperature of 200° C. and a pressure of 1 mm. Hg. The products were alpha-olefins containing 12–16 carbon atoms and the hydride. A conversion of 42.4 percent was obtained. The mixture of trialkylaluminum and hydride was reused in extracting additional olefins from the olefin enriched light coker gas oil at 125° C. for 3 to 4 hours. The reaction mixture was passed through the molecular still at 205° to 210° C. and 1 mm. Hg vacuum. A conversion of 59.0 percent was obtained. The cycle was repeated three additional times with the olefin yields varying from about 50 to 70 percent.

A continuous method for the removal of alpha-olefins from a hydrocarbon mixture is illustrated in the accompanying drawing which forms part of the present specification.

In the drawing, a topped light coker gas oil containing 40 percent $C_{12}$–$C_{16}$ alpha-olefins and 0.5 percent sulfur compounds is fed through a line 5 to purification tower 6. The coker gas oil feed is fed into the lower half of the purifier 6. This purifier operates in a manner similar to an extractive distillation tower. A small amount of the recycle stream of dialkylaluminum hydride-trialkylaluminum in which the alkyl substituents are $C_{12}$–$C_{16}$ radicals is fed to the upper half of the purifier 6, through line 7, at a rate sufficient to remove the impurities with light coker gas oil. Five weight percent of the hydride-trialkyl recycle stream, based on the alpha-olefin product stream, is used. The temperature in the purifier is about 175° to 235° C. and at a pressure of 30 to 200 mm. Hg.

The removal of impurities from the hydrocarbon feed containing alpha-olefins by means of the hydride may be conducted at a general temperature of about 160° to 235° C. and a pressure chosen to cause the hydrocarbon to distill at the required temperature. The amount of hydride stream, whether pure hydride or admixed with trialkylaluminum or other material, employed for the extraction of impurities, may comprise about .01 to .10 part of hydride contained in the stream per part by weight of product alpha-olefins. More usually, the purification treatment may be effected at a temperature of about 170° to 180° C., and the hydride is employed in an amount of about .03 to .05 part per unit weight product alpha-olefins. The period of contact may be varied by adjusting the boil-up rate and reflux ratio in the column.

The purified coker gas oil leaves the purifier 6 through an overhead line 8 and passes to an addition reactor 9 wherein the alpha-olefins are reacted with hydride. The contaminants contained in the hydride are withdrawn through line 10. The hydride-trialkyl recycle stream is fed to the addition reactor 9, through line 11. The resdence time in reactor 9 is about 1 hour. The temperature within the reactor 9 is maintained at 125° C. and at a pressure of about 5 p.s.i.g. As a consequence, substantially all the alpha-olefins contained in the feed mixture are reacted with the hydride to produce the corresponding trialkylaluminum.

The reaction product leaves the reactor 9 through a line 12 and enters a fractionating column 14 at about the middle part thereof. The overhead temperature of the fractionator 14 is held at about 140° C. and the bottom thereof at about 160° C. The unreacted hydrocarbon material contained in the reaction mixture is yielded overhead via line 15, whereas the trialkylaluminum, being higher boiling, is yielded as the bottom product through line 16.

The trialkylaluminum product leaving the bottom of the fractionator 14 then enters a decomposition reactor or molecular still 17. The decomposition reactor 17 may be simply a holding vessel in which the trialkylaluminum is held at the desired temperature to effect decomposition to the hydride and alpha-olefins, or a thin film type still. In either case, the temperature in the reactor 17 is about 210° C. and the pressure is 1 mm. Hg. The decomposition mixture remains in the reactor 17 for a period of about 0.5 minute, and thereafter, alpha-olefins are yielded continuously as an overhead product through line 18 and the resultant hydride-trialkylauminum mixture, i.e., about 60 percent hydride concentration, is withdrawn from the bottom thereof through a line 19. The hydride-trialkyl mixture is reused in the purifier 16 and reactor 9 as explained hereinabove.

Although this invention has been described with respect to particular embodiments thereof, it is not to be so limited, as changes and modifications may be made therein which are within the spirit and scope of the invention as defined by the appended claims.

What is claimed is:

1. A process which comprises passing a dialkylaluminum hydride to a reaction zone, passing a feed mixture containing an alpha-olefin containing at least 5 carbon atoms and at least one additional hydrocarbon to the reaction zone, whereby the alpha-olefin reacts with the hydride to produce a trialkylaluminum, separating the trialkylaluminum from the resultant reaction product, subjecting the trialkylaluminum to heat whereby the same is decomposed to a hydride and alpha-olefin, separating the alpha-olefin from the hydride, and recycling at least part of the hydride to the reaction zone.

2. A process which comprises passing a dialkylaluminum hydride in which the alkyl substituents contain about 2 to 18 carbon atoms to a reaction zone, passing a mixture including an alpha-olefin containing about 5 to 18 carbon atoms and non-olefinic hydrocarbons to the reaction mixture, thereby the hydride reacts with the alpha-olefin to produce a trialkylaluminum, separating the trialkyl from the resultant product mixture, subjecting the trialkyl to heat in order to decompose the same into a hydride and alpha-olefin, separating the hydride from the alpha-olefin and reusing at least part of the same in the reactor.

3. The process of claim 2 wherein the reactor is maintained at a temperature of about 80° to 130° C.

4. The process of claim 2 wherein the trialkylaluminum is subjected to a temperature of about 160° to 220° C.

5. A process which comprises contacting a mixture including an alpha-olefin containing about 2 to 18 carbon atoms, a non-olefinic hydrocarbon and a sulfur containing impurity with a dialkylaluminum hydride in which the alkyl substituents contain about 2 to 18 carbon atoms, thereby removing at least a substantial amount of the impurity therefrom, passing the purified mixture into a reaction zone to which is also passed a dialkylaluminum hydride in which the alkyl substituents contain about 2 to 18 carbon atoms, thereby the hydride reacts with the alpha-olefin to produce the corresponding trialkyl compound, separating the trialkyl compound from the resultant reaction product and subjecting the same to heat in order to decompose the same into alpha-olefin and hydride, and reusing the hydride to remove impurities and react with alpha-olefin as aforementioned.

6. A process which comprises passing a first mixture of trialkylaluminum and dialkylaluminum hydride in which the alkyl substituents contain 9 to 18 carbon atoms to a reaction zone, the first mixture contains from 40 to 90 percent hydride, passing a second mixture including an alpha-olefin containing 9 to 18 carbon atoms and a non-olefinic hydrocarbon to the reaction zone, thereby reacting the alpha-olefin with the hydride to form the corresponding triakyl and resulting in a product mixture containing non-olefinic hydrocarbon, hydride and trialkyl, separating the hydrocarbon from the hydride and trialkyl, heating the mixture of hydride and trialkyl to cause part of the trialkyl to decompose to hydride and alpha-olefin in an amount equivalent to the quantity of alpha-olefin which is reacted in the reaction zone, separating the alpha-olefin from the mixture of hydride and trialkyl, and reusing the mixture of hydride and trialkyl in the reaction zone.

7. A process which comprises contacting a mixture including an alpha-olefin, a non-olefinic hydrocarbon and at least one impurity selected from the group consisting of sulfur, oxygen and nitrogen with a dialkylaluminum hydride thereby removing at least a substantial amount of the impurity therefrom, passing the purified mixture into a reaction zone to which is also passed a dialkylaluminum hydride and reacting the second said dialkylaluminum hydride with the alpha-olefin to produce the corresponding trialkyl compound, separating the trialkyl compound from the resultant reaction product and subjecting the same to heat in order to decompose the same into alpha-olefin and hydride.

8. The process of claim 7 wherein the recovered hydride is reused to remove impurities and to react with alpha-olefins as in claim 7.

9. The process of claim 7 wherein each said dialkylaluminum hydride contains alkyl substituents having 2 to 18 carbon atoms, and the alpha-olefin contains 2 to 18 carbon atoms.

References Cited by the Examiner
UNITED STATES PATENTS

| | | | |
|---|---|---|---|
| 809,086 | 1/1906 | Blackmore | 208—237 |
| 2,739,925 | 3/1956 | Arnold et al. | 208—238 |
| 2,962,513 | 11/1960 | Meiners | 260—448 |
| 2,987,535 | 6/1961 | Mirviss | 260—488 |
| 3,014,941 | 12/1961 | Walsh | 260—488 |
| 3,035,105 | 5/1962 | Hoffman | 260—683.15 |
| 3,148,226 | 9/1964 | Schneider et al. | 208—248 |
| 3,180,881 | 4/1965 | Zosel et al. | 260—683.15 |
| 3,184,520 | 5/1965 | Roberts | 208—143 |
| 3,210,435 | 10/1965 | Kennedy et al. | 260—677 |

ALPHONSO D. SULLIVAN, *Primary Examiner.*